United States Patent Office 3,705,084
Patented Dec. 5, 1972

3,705,084
MACROPOROUS ENZYME REACTOR
John H. Reynolds, St. Louis, Mo., assignor to
Monsanto Company, St. Louis, Mo.
No Drawing. Continuation-in-part of abandoned application Ser. No. 20,639, Mar. 18, 1970. This application Feb. 4, 1971, Ser. No. 112,802
Int. Cl. C07g 7/02
U.S. Cl. 195—63
30 Claims

ABSTRACT OF THE DISCLOSURE

A flow-through enzyme reactor comprising a macroporous reactor core; a polymeric surface on said core having adsorption promoting groups which are members of the group consisting of nitrilo, acid amido and ureido; and an active enzyme adsorbed on said polymeric surface and cross-linked in place.

REFERENCE TO RELATED APPLICATIONS

This application is a continuation-in-part of copending application Ser. No. 20,639 filed on Mar. 18, 1970, now abandoned.

BACKGROUND OF THE INVENTION (1) Field of invention

Enzymes—Insoluble.

(2) Prior art

The various activities and uses of enzymes are well-established and documented. Enzymes are proteinaceous in nature and are commonly water-soluble. They are subject to degradation by processes such as proteolysis, autolysis, and thermal denaturation, thus their use is also attended by a loss or "using up" of the enzyme. Recently attempts have been made to prolong the useful life of enzymes by rendering them insoluble and thus suitable for recovery and reuse. Such efforts have met with greater or lesser degrees of success; however, such efforts are seriously handicapped by the high cost of organic materials that are suggested for combination with the enzymes in order to produce an insoluble product and high processing costs for their production. It would be highly desirable to have available insoluble, long-acting and re-useable forms of enzymes which do not suffer from the disadvantage of high cost. It would also be advantageous to have such enzymatically-active materials available in forms adapted for ready contact of a substrate with the insolublized enzyme.

It is an object of the present invention to provide enzyme reactors having a reactor core containing immobilized enzymes on a solid, insoluble, polymeric surface which can be reused many times over with minimal loss of enzyme activity and through which substrates can be passed at relatively high flow rates with minimal loss of the enzyme into the reaction stream.

Still other objects will readily present themselves to one skilled in the art upon reference to the ensuing discussion, and the claims.

SUMMARY OF THE INVENTION

The present invention provides immobilized enzymes which are adsorbed to the polymeric material and adapted to be used in a macroporous core of an enzymatic reactor. The active enzyme adsorbed on the polymeric surface is further immobilized by cross-linking in place with a crosslinking agent such as dialdehyde, monomeric polyisocyanate, bisamidoester, disulfonyl halide, and the like. The macroporous reactor core can be made of acrylic type or polyamide type macromolecules, polyurethane, and the like, thereby providing an adsorption-promoting surface, or it can be made of an inert material, such as a foamed, open cell, polyolefin or the like, and then the surfaces thereof coated so as to provide the desired polymeric surface thereon.

Such immobilized enzymes, when enclosed in a holder or column fitted with inlet and outlet ports through which the substrates are passed and attached to appropriate pumping, filtering, and monitoring equipment, comprise a novel enzyme reactor system, the relatively high porosity of the reactor core allowing high flow rates through the reactor.

Enzyme reactors of this invention are particularly suitable for applications in cheese manufacture for clotting of milk, in the production of glucose from starch, in sweetening of crude syrups, in chillproofing of beer, in synthesis of organic intermediates, in production of flavor enhancers such as nucleotides, in specific waste treatments, for the removal of undersirable polysaccharides from soy milks, for the determination of blood glucose and other components of physiological fluids, and the like.

DESCRIPTION OF THE PREFERRED EMBODIMENTS

The polymeric surface suitable for the attachment of enzymes thereto in accordance with the present invention can be made of a water-insoluble polymer having nitrilo ($\equiv$N), acid amido (—$CONH_2$) or ureido (—$NHCONH_2$)

groups which promote enzyme adsorption. Typical of such polymers is an acrylic resin such as the polymers or copolymers of acrylic acid, methacrylic acid, esters of the foregoing acids or acrylonitrile, for example, polyacrylamide and polyacrylonitrile. Also suitable are polyamide macromolecules such as a polylactam produced by the polymerization of lactam monomers of the formula

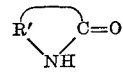

wherein R' is an alkylene group having 3 to about 12 carbon atoms, preferably 5 to 12 carbon atoms. Suitable lactam monomers are epsilon-caprolactam, alpha-pyrrolidone, piperidone, valerolactam, methylcyclohexanone oximes, capryllactam, cyclodecanone isoxime, lauryllactam, and the like. Typical polyamide resins are polycaprolactam (nylon 6), polyhexamethylenedipamide (nylon 6,6), and the like. Also contemplated are polyamides proteinaceous in nature such as collagen, albumins, and the like.

Another type of polymer that can be advantageously utilized for this purpose is a polyurethane resin which is produced by the reaction of polyfunctional isocyanates with organic compounds containing active hydrogen atoms such as alcohols (including phenols), carboxylic acids, polyester adducts derived from the condensation of polyols with polycarboxylic acids and anhydrides, and the like, i.e., with organic compounds such as polyesters or polyethers which contain at least two free hydroxyl groups, in the presence of various adjuvants well known in the art such as catalysts, emulsifiers, foaming or blowing agents, or the like.

Polyacrylonitrile, polycaprolactam and polyurethane are the preferred polymeric materials for purposes of the present invention.

As stated above, the reactor core can be suitably provided from polymeric material such as flocculated nylon 6, spun-bonded polyamide, spun-bonded polyacrylonitrile, or the like. Alternatively an inert structure having the desired porosity such as a porous polyethylene, polypropylene, or polystyrene, sintered ceramics, fritted glass, or the like, can be provided and then coated with the polymeric material. Porosity of the structure is dependent on the contemplated end use and substrate viscosity and is chosen so as to minimize the pressure drop across the reactor at practical flow rates therethrough. In addition to being used as surface coatings on an inert porous structure, the polyurethane resins can also be used in the form of open-cell foams to provide at the same time the desired porous three-dimensional structure.

The reactor core is macroporous and the inner surfaces of the core are provided with the aforementioned adsorption promoting groups. Pores in the reactor core are sufficiently large so as not to be obstructed or plugged by crosslinked enzyme molecules but which permit such cross-linked enzyme molecules to be adsorbed or to remain adsorbed on the pore surfaces within the reactor core without materially impeding the flow of a substrate therethrough. Resiliency of the reactor core is not objectionable and in some instances is desirable; however, the core should not be compressible under normal reactor operating conditions so as to cut off or substantially impede substrate flow. Moreover, an expandable reactor core can sometimes be utilized, with at least a portion of the reactor core elements being expanded or fluidized by the action of the substrate passing therethrough.

The active enzyme may be obtained from any suitable source, either vegetable, animal, or microbial. Many such enzymes are available commercially. Typical of these are ribonuclease, trypsin, ficin, subtilisin, catalase, pepsin, papain, carboxypeptidase, rennin, chymotrypsin, and the like. Enzyme mixtures can also be employed. Typical are mixtures of the proteases, e.g., acid and/or neutral and/or alkaline protease.

Many such enzymes can conveniently be obtained from microorganisms which include bacteria, yeasts, fungi and the like by using well-known fermentation methods such as those generally described in Kirk-Othmer, Encyclopedia of Chemical Technology 8, 173–204, and a great many microbially-produced enzymes are available commercially.

The exact activity of the enzyme or enzymes employed as starting material depends on the exact method of preparation and is not critical to the present invention providing only that the immobilized enzyme derived therefrom has the desired enzymatic activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH; the reaction is stopped by the addition of trichloroacetic acid, and the solution is filtered and the absorbance at 280 millimicrons determined. Amylase activity is generally determined by the well-known dinitrosalicylic acid method of Bernfeld. Still other test procedures are known in the art and some are set forth hereinafter.

The enzymes are initially attached to the polymeric surface by adsorption.

The enzymes adsorptively held within the macropores of the reactor core can be cross-linked in place so as to form an enzyme-active polymeric unit which is more firmly held in place by the adsorptive forces due to the resulting relatively higher molecular weight thereof.

For the purposes of this invention suitable difunctional cross-linking agents are dialdehydes, bisamidoesters, monomeric polyisocyanates, disulfonyl halides, and the like.

Illustrative dialdehydes are glyoxal, glutaraldehyde, malonic aldehyde, succinaldehyde, and the like, preferably containing from 2 to 8 carbon atoms, inclusive.

Illustrative monomeric polyisocyanates are xylylene diisocyanate, toluene-2,4-diisocyanate, toluene-2,6-diisocyanate, diphenylmethane-4,4'-diisocyanate, 3-methyldiphenylmethane-4,4'-diisocyanate, 1,1 - bis(4 - isocyanatophenyl)cyclohexane, m - phenylene diisocyanate, p - phenylene diisocyanate, chlorophenylene-2,4-diisocyanate, naphthalene-1,5-diisocyanate, diphenyl-4,4'-diisocyanate, 3,3-dimethyldiphenyl-4,4'-diisocyanate, diphenylether-4,4'-diisocyanate, and the like.

Suitable bisamido esters are those derived from dicarboxylic acids of about 4 to about 10 carbon atoms such as dimethyladipimidate, and the like.

Illustrative disulfonyl halides are naphthalene-1,5-disulfonyl chloride, naphthalene-1,6-disulfonyl chloride, naphthalene-2,5-disulfonyl chloride, benzene-1,3-disulfonyl chloride, and the like.

The amount of cross-linking agent present is dependent principally on the amount of enzyme or enzymes that is to be bonded to the polymeric surface. Usually the enzyme-cross-linking agent weight ratio is about 1:5 or less. A ratio of about 1:20 is preferred.

Where the reactor core is an inert, macroporous, three-dimensional structure, the deposition of the polymer is achieved by preparing a non-aqueous solution of the water-insoluble polymer in a suitable organic solvent for the polymer, impregnating the macroporous reactor core with the non-aqueous solution, and thereafter precipitating the polymer onto the reactor core by passing therethrough a polymer precipitating agent such as water, for example. Immobilization of an active enzyme in the reactor core is accomplished by passing therethrough an aqueous solution containing the desired active enzyme.

Where the reactor core is made up of the polymeric material itself, for example, polyurethane, spun-bonded polyamide, or spun-bonded polyacrylonitrile, the polymeric surface can be activated, if desired, by washing with an appropriate solvent before the aqueous active enzyme solution is passed therethrough. In this manner the very surface layer of the polymeric material is dissolved away presenting a fresh, uncontaminated surface for the attachment of the active enzyme. The reactor core still has to possess the requisite macroporosity to readily pass the substrate therethrough, however.

Immobilization of the enzyme with or without a cross-linking agent can be carried out in an aqueous medium at pH conditions and temperature which do not tend to inactivate the enzyme. Temperatures above about 60° C. should generally be avoided. The present process is readily carried out at ambient room temperature using an aqueous solution of the enzyme and the cross-linking agent.

The temperature of choice depends, however, mainly on the particular enzyme or mixture of enzymes used. Usually the temperature can range from about −5° C. to about 30° C. A temperature in the range from about 10° C. to about 25° C. is preferred. Enzyme concentration in the solution is not critical and can vary from about 0.005 to about 5 percent by weight, preferably from about 0.1 to about 2 percent by weight.

Moreover, it has been found that excess active enzyme on the polymeric surface can be washed off by treating the reactor core, after passing therethrough the active enzyme-containing solution, with an aqueous solution of a water-miscible organic solvent which can be a lower alkanol containing up to four carbon atoms, inclusive, i.e., methanol, ethanol, isopropanol, n-butanol, etc., or a lower alkyl ketone containing up to four carbon atoms, inclusive, in the alkyl portions thereof, i.e., acetone, methyl ethyl ketone, methyl propyl ketone, methyl butyl ketone, etc. Preferably the water-miscible organic solvent is present in an amount in the range from about 5 to about 15 percent by volume.

In coating the macroporous reactor core with the polymeric coating, the polymeric material is dissolved in a suitable inert organic solvent such as formic acid, trifluoroethanol, dimethylformamide, N,N-dimethylpyrrolidinone, dimethylacetamide, dimethylsulfoxide, or the like, depending on the nature of the material. The macroporous enzyme support structure is then permeated with the resulting solution and thereafter the polymeric material precipitated from the solution onto the porous structure by passing through the soaked or impregnated structure a suitable polymer precipitant, for example water as set forth previously. The organic solvent is washed out simultaneously.

The present invention is further illustrated by the following examples.

EXAMPLE 1

Alkaline protease reactor

A polyethylene disk 38 millimeters in diameter and 1/8 inch thick was cut from a sheet of porous polyethylene and was permeated with a 10 weight percent solution of polyacrylonitrile in N-methylpyrrolidinone at 50° C. Thereafter excess polymer solution was removed from the outer surfaces of the disk, and the disk was placed in a suitable holder.

Distilled water was then pumped through the disk to precipitate the polyacrylonitrile on the internal disk surfaces and to remove the N-methylpyrrolidinone.

An aqueous enzyme solution containing alkaline protease (subtilisin Carlsberg) (0.1 percent by weight) and glutaraldehyde (3 percent by weight) and having a pH of 6 was prepared and pumped repeatedly through the disk for about three hours. Thereafter the disk was washed with tris(hydroxymethyl)aminomethane buffer solution (pH 8.0) to which potassium chloride (1 M) has been added to wash out unbound enzyme.

The assay procedure comprised adding 0.1 percent denatured lysozyme to tris(hydroxymethyl)aminomethane buffer (pH 8.0) solution and pumping the resulting solution through the disk at a rate of 8.0 milliliters per minute. The effluent was collected in test tubes containing aqueous 5 weight percent trichloroacetic acid solution, filtered to remove any precipitate that may be present and measuring the absorbence of the filtrate in a spectrophotometer at a wavelength of 280 millimicrons.

Esterase activity of the subtilisin reactor was determined using solutions of benzoylarginine ethyl ester. An enzymatically active reactor core was produced.

EXAMPLE 2

Subtilisin reactor

Long term protease activity of a subtilisin reactor prepared as in Example 1 towards casein was demonstrated. A 0.1 weight percent solution of casein was passed through the reactor for three weeks. At the end of that time it had lost only 10 percent of its original activity. Similar results were obtained with benzoyl arginine ethyl ester as substrate.

EXAMPLE 3

Chymotrypsin reactor

A polyethylene disk 140 millimeters in diameter and 1/8 inch thick was cut from a sheet of porous polyethylene and was permeated with a 10 weight percent solution of polyacrylonitrile in N-methylpyrrolidinone at 50° C. Thereafter excess polymer solution was removed from the outer surfaces of the disk, and the disk was placed in a membrane holder.

Distilled water was then pumped through the disk to precipitate the polyacrylonitrile on the disk surfaces and to remove the N-methylpyrrolidinone.

An aqueous enzyme solution containing α-chymotrypsin (0.1 percent by weight) and glutaraldehyde (3 percent by weight) and having a pH of 6.5 was prepared and pumped repeatedly through the disk for about 1 hour. Thereafter the disk was washed with tris(hydroxymethyl)aminomethane buffer (pH 8.0) solution to which potassium chloride (1 M) has been added to wash out unbound enzyme and then assayed.

Esterase activity was demonstrated with acetyl tyrosine ethyl ester, and benzoyl tyrosine ethyl ester. Amidase activity was demonstrated with carbobenzoxy-tyrosine p-nitroanilide. Milk clotting activity was observed when a solution of 6% dry milk (non-fat) was passed through the reactor.

EXAMPLE 4

Trypsin reactor

A polyethylene disk 38 millimeters in diameter and 1/8 inch thick was cut from a sheet of porous polyethylene and was soaked in a 10 weight percent solution of nylon 6,6 in formic acid at 50° C. Thereafter excess polymer solution was removed from the outer surfaces of the disk, and the disk was placed in a membrane holder.

Distilled water was then pumped through the disk to precipitate the nylon 6,6 on the disk surfaces and to remove the formic acid.

An aqueous enzyme solution containing trypsin (0.1 percent by weight) and glutaraldehyde (3 percent by weight) and having a pH of 6.5 was prepared and pumped repeatedly through the disk for one hour. Thereafter the disk was washed with tris(hydroxymethyl)aminomethane buffer (pH 8.0) solution to which potassium chloride (1 M) has been added to wash out unbound enzyme and then assayed.

Enzyme activity was demonstrated with benzoyl arginine ethyl ester and tosyl arginine methyl ester, and amidase activity towards benzoyl arginine p-nitroanilide. Protease activity was observed with casein.

EXAMPLE 5

Alkaline phosphatase reactor

A polyethylene disk 38 millimeters in diameter and 1/8 inch thick was cut from a sheet of porous polyethylene and was soaked in a 10 weight percent solution of polyacrylonitrile in N-methylpyrrolidinone at 50° C. Thereafter excess polymer solution was removed from the outer surfaces of the disk, and the disk was placed in a membrane holder.

Distilled water was then pumped through the disk to precipitate the polyacrylonitrile on the disk surfaces and to remove the N-methylpyrrolidinone.

An aqueous enzyme solution containing alkaline phosphatase (chicken intestine) (0.1 percent by weight) was pumped repeatedly through the disk for about one-half hour. The enzyme was then cross-linked with glutaraldehyde as in Example 4. Thereafter the disk was washed with glycine buffer solution to which potassium chloride (1 M) has been added to wash out unbound enzyme and the assayed.

The alkaline phosphatase reactor was assayed with o-carboxyphenyl phosphate and found to have substantial enzyme activity.

EXAMPLE 6

Ribonuclease reactor

In a manner similar to Example 5 a disk was prepared to which bovine pancreatic ribonuclease was adsorbed and then cross-linked in place. It exhibited activity towards both cytidine-2',3'-cyclic phosphate, and yeast ribonucleic acid.

EXAMPLE 7

Ficin reactor

In a manner similar to Example 5 a disk was prepared to which ficin was adsorbed and then cross-linked in place. It exhibited activity towards casein and benzoyl arginine ethyl ester.

EXAMPLE 8

Pepsin reactor

In a manner similar to Example 5 a disk was prepared to which porcine pepsin is adsorbed and then cross-linked in place. It exhibits activity towards hemoglobin.

EXAMPLE 9

Invertase reactor

In a manner similar to Example 5 a disk was prepared to which invertase was adsorbed and then cross-linked in place. It exhibited activity towards sucrose.

EXAMPLE 10

Pepsin reactor

In a manner similar to Example 5 a disk was prepared to which chicken pepsin is adsorbed and then cross-linked in place. It exhibits activity towards hemoglobin.

EXAMPLE 11

Mixed enzyme reactor

In a manner similar to Example 5 a disk was prepared to which a mixture of *B. subtilis* enzymes, neutral protease, alkaline protease and amylase is adsorbed and then crosslinked in place. Activity is demonstrated towards casein, benzoyl arginine ethyl ester and furylacryloylglycyl leucine amide.

EXAMPLE 12

Catalase reactor

In a manner similar to Example 5 a disk was prepared to which catalase was adsorbed and then cross-linked in place. It exhibited activity towards hydrogen peroxide.

EXAMPLE 13

Polyphenol oxidase reactor

In a manner similar to Example 5, a disk was prepared to which polyphenol oxidase was adsorbed and then cross-linked in place. It exhibited activity towards dihydroxyphenylalanine.

EXAMPLE 14

Subtilisin Carlsberg reactor

In a manner similar to Example 1 three disks were prepared to which subtilisin Carlsberg was adsorbed and then cross-linked in place. Each disk converted a $10^{-3}$ M solution of benzoyl arginine ethyl ester to benzoyl arginine. The degree of conversion to this product for each disk, when introduced into the reactor system, was 60 percent. When each of these disks was placed in tandem in the reactor system the total degree of conversion to the product was 95 percent.

EXAMPLE 15

Amyloglucosidase reactor

In a manner similar to Example 5 a disk was prepared to which is adsorbed amyloglucosidase and then cross-linked in place. It is active towards starch solutions and produces glucose as the product.

EXAMPLE 16

α-Galactosidase reactor

In a manner similar to Example 5 a disk was prepared to which is adsorbed α-galactosidase and then cross-linked in place. It is active towards p-nitrophenyl galactoside.

EXAMPLE 17

Tandem reactors

In a manner similar to Example 5 two disks are prepared to one of which is adsorbed pyruvate kinase (PK) and then cross-linked in place and to the other is adsorbed lactate dehydrogenase (LDH) and then cross-linked in place. These two disks are inserted into the reactor system in a tandem, the PK being first and the LDH being second. A solution of phosphoenolpyruvate is pumped through the reactor containing the two disks. The product of the enzymatic reaction in the first disk produces pyruvate which is further reacted in the second disk to produce lactic acid.

EXAMPLE 18

Rennin reactor

In a manner similar to Example 5 a disk was prepared to which rennin was adsorbed and then crosslinked in place. When inserted into the reactor system it was found to clot milk.

EXAMPLE 19

Chymotrypsin reactor

Twenty large-pore polyethylene disks (pore size about 1/32 inch) were permeated with a 5 percent (w./v.) solution of polyacrylonitrile in dimethylsulfoxide at 50° C. Excess of the polymer solution was then removed from the permeated disks by washing in a stream of distilled water at the same time precipitating the polyacrylonitrile onto the surfaces of the disks. The washed disks were transferred to a 1.5 inch by 4 inch stainless steel nipple and reducing ends fitted with swage-lock adapters were attached to both ends of the nipple. Distilled water (about two liters) was pumped through the thus assembled reactor, and the reactor then immersed into a water bath maintained at 34° C.

An aqueous 1 percent (w./v.) chymotrypsin solution (150 milliliters, pH 6.5) was then recycled through the reactor for 30 minutes. The amount of chymotrypsin deposited onto the disks was calculated by comparing the absorbance difference of the chymotrypsin solution before and after recycling and was found to be 100 milligrams. Glutaraldehyde (1 percent [v./v.]) was then added to the chymotrypsin solution, the pH thereof adjusted to 6.5 by the addition of aqueous 1 N solution of sodium hydroxide, and the resulting solution recycled through the reactor for about one hour. Thereafter the solution was withdrawn from the reactor and the reactor core washed by pumping distilled water (about two liters) therethrough.

The thus prepared reactor was assayed with benzoyl-tyrosine p-nitroanilide substrate in a 10 percent (v./v.) solution of acetone in water containing 0.05 M tris(hydroxymethyl)aminomethane buffer (pH 8.0). Conversion of the substrate to benzoyl tyrosine and p-nitroaniline was monitored continuously at 380μ using a spectrophotometer fitted with a flow cell. The amount of active chymotrypsin present in the reactor was estimated to be 65 milligrams.

EXAMPLE 20

Subtilisin reactor

A cylinder of polyurethane foam was cut and fitted into a 1.5 inch by 2 inch stainless steel nipple which was then fitted with reducing ends having swage-lock adapters. A 10 percent (v./v.) acetone/water solution was then pumped through the reactor so as to thoroughly wash and wet the polyurethane foam. Thereafter an aqueous 0.1 percent (w./v.) solution of subtilisin Carlsberg was recycled through the reactor for 30 minutes.

The amount of subtilisin Carlsberg attached to the polyurethane foam was calculated to be 20 milligrams. The enzyme was then cross-linked as in Example 4. The reactor was then washed with aqueous 0.1 M potassium chloride solution (500 milliliters) and assayed. The reactor was found to be active towards benzoyl arginine ethyl ester in a 0.05 M tris(hydroxymethyl)aminomethane buffer (pH 8.0) containing 0.1 M potassium chloride.

EXAMPLE 21

Glucose oxidase reactor

In a manner similar to Example 19 glucose oxidase was immobilized in a reactor by cross-linking the adsorbed enzyme in place. The reactor was found to convert a $10^{-2}$ M solution of glucose to gluconic acid in 80 percent yield at a flow rate of 2 milliliters per minute.

EXAMPLE 22

Saccharifying amylase reactor

In a manner similar to Example 19 a saccharifying amylase reactor was constructed. The reactor was found to be active and to produce glucose from a soluble starch substrate solution at pH 6.

EXAMPLE 23

Reactor for the determination of glucose

In a manner similar to Example 19 a reactor is constructed with a plurality of polyethylene disks. The lower half of the disk assembly contains disks with adsorbed glucose oxidase and the upper half of the disk assembly contains disks with adsorbed peroxidase. Both enzymes are cross-linked in place. A solution of glucose in aqueous 0.01 M phosphate buffer (pH 7.0) containing o-dianisidine ($8.2 \times 10^{-4}$ M) is then passed through the reactor (upward flow) and the effluent continuously monitored by means of a spectrophotometer at $425\mu$ to obtain a quantitative assay for glucose.

EXAMPLE 24

Glucose isomerase

In a manner similar to Example 19 a reactor was constructed containing porous polyethylene disks with adsorbed glucose isomerase cross-linked in place. The reactor was active toward an aqueous solution containing glucose and produced a solution containing fructose and glucose.

EXAMPLE 25

Pectinase reactor

In a manner similar to Example 19 a reactor is constructed using polyethylene disks containing adsorbed pectinase (pectin methyl esterase) and pectin depolymerase cross-linked in place. The reactor is active toward pectin reducing the haze in apple juice and grape juice.

EXAMPLE 26

Amino acylase reactor

In a manner similar to Example 19 a reactor is constructed using polyethylene disks containing adsorbed amino acylase crosslinked in place. The reactor is active towards DL-acetylmethionine.

EXAMPLE 27

Chymopapain reactor

In a manner similar to Example 19 a reactor is constructed using polyethylene disks containing adsorbed chymopapain which has been crosslinked. The reactor exhibits activity towards benzoyl arginine ethyl ester.

EXAMPLE 28

Spun-bonded polyamide reactor

Spun-bonded polyamide fibers (1 oz./yard, 30 grams) was packed in a stainless steel tube, reducing ends attached to the tube and 300 milliliters of a 65 percent (w./v.) solution of formic acid passed therethrough followed by three liters of distilled water. Thereafter chymotrypsin was adsorbed on the spun-bonded nylon and then cross-linked in a manner similar to Example 19. The thus constructed reactor was found to exhibit esterase, amidase, and protease activity.

EXAMPLE 29

Flocculant nylon 6 reactor

Polycaprolactam (10 grams) was dissolved in a 65 percent (w./v.) solution of formic acid at 25° C. and the obtained solution poured into distilled water (5 liters). A flocculant polymeric material was produced, was washed with distilled water, and then packed into a 4-inch stainless steel column. A 0.15 percent (w./v.) solution of trypsin (200 milliliters) was recycled through the column until 120 milligrams of trypsin was retained in the column. Thereafter an aqueous solution containing 1.5 percent (w./v.) glutaraldehyde was added to the recycling solution to cross-link the enzyme. The solution pH was maintained at 7.0 by the addition of an aqueous 0.1 N sodium hydroxide solution.

The reactor column was then washed with an aqueous solution containing 0.3 N potassium chloride and assayed with $10^{-3}$ M tosyl arginine methyl ester using a 0.025 M tris(hydroxymethyl)aminomethane buffer solution (pH 8.0) and 0.1 N potassium chloride. At a flow rate of 28 milliliters per minute the reactor converted tosyl arginine methyl ester to tosyl arginine in a 75 percent yield.

The foregoing discussion and the examples are intended as illustrative but not limiting. Still other variations within the spirit and scope of this invention will readily present themselves to one skilled in the art.

I claim:

1. A flow-through enzyme reactor comprising a macroporous reactor core; a polymeric surface selected from the group consisting of acrylic, polyamide and polyurethane resins on said core having adsorption promoting groups which are members selected from the group consisting of nitrilo, acid amido and ureido; and an active enzyme adsorbed on said polymeric surface and cross-linked in place by a difunctional agent selected from the group consisting of a dialdehyde, a monomeric polyisocyanate, a bisamidoester and a disulfonyl halide.

2. The enzyme reactor of claim 1 wherein the reactor core is polyethylene and the polymeric surface is polyacrylonitrile.

3. The enzyme reactor of claim 1 wherein the reactor core is polyethylene and the polymeric surface is polycaprolactam.

4. The enzyme reactor of claim 1 wherein the reactor core is polyethylene.

5. The enzyme reactor of claim 1 wherein the enzyme is ribonuclease.

6. The enzyme reactor of claim 1 wherein the enzyme is ficin.

7. The enzyme reactor of claim 1 wherein the enzyme is subtilisin.

8. The enzyme reactor of claim 1 wherein the enzyme is alkaline phosphatase.

9. The enzyme reactor of claim 1 wherein the enzyme is polyphenol oxidase.

10. The enzyme reactor of claim 1 wherein the enzyme is catalase.

11. The enzyme reactor of claim 1 wherein the enzyme is trypsin.

12. The enzyme reactor of claim 1 wherein the enzyme is alkaline protease.

13. The enzyme reactor of claim 1 wherein the enzyme is chymotrypsin.

14. The enzyme reactor of claim 1 wherein the enzyme is invertase.

15. The enzyme reactor of claim 1 wherein the enzyme is rennin.

16. The enzyme reactor of claim 1 wherein the dialdehyde is glutaraldehyde.

17. The enzyme reactor of claim 1 wherein the polymeric surface is polycaprolactam.

18. The enzyme reactor of claim 1 wherein the reactor core and the polymeric surface both are polyacrylonitrile.

19. The enzyme reactor of claim 1 wherein the reactor core and the polymeric surface both are polyurethane.

20. The enzyme reactor of claim 1 wherein the reactor core and the polymeric surface both are spun-bonded polyamide.

21. The enzyme reactor of claim 1 wherein the enzyme is glucose oxidase.

22. The enzyme reactor of claim 1 wherein the enzyme is saccharifying amylase.

23. The enzyme reactor of claim 1 wherein the enzyme is glucose isomerase.

24. The enzyme reactor of claim 1 wherein the enzyme is a mixture of pectinase and pectin depolymerase.

25. The enzyme reactor of claim 1 wherein the enzyme is amino acylase.

26. The enzyme reactor of claim 1 wherein the enzyme is chymopapain.

27. A method for immobilizing an active enzyme in an enzyme reactor which comprises
providing a polymeric surface selected from the group consisting of acrylic, polyamide and polyurethane resins having adsorption-promoting groups which are members selected from the group consisting of nitrilo, acid amido, and ureido, on a macroporous reactor core and
contacting said polymeric surface with an aqueous solution containing an active enzyme to adsorb the enzyme by said groups on said polymeric surface and with a difunctional agent selected from the group consisting of a dialdehyde, a monomeric polyisocyanate, a bisamidoester and a disulfonyl halide to cross-link said enzyme in place.

28. The method in accordance with claim 27 wherein the polymeric surface, after contacting with an active enzyme and with said difunctional agent, is contacted with an aqueous solution of an organic solvent selected from the group consisting of a lower alkanol and a lower alkyl ketone, each containing up to four carbon atoms, inclusive, in the alkyl portions thereof.

29. A method for immobilizing an active enzyme in an enzyme reactor which comprises the steps of
providing a macroporous reactor core;
providing a solution in an inert organic solvent of a water-insoluble polymer selected from the group consisting of acrylic, polyamide and polyurethane resins having adsorption-promoting groups which are members selected from the group consisting of nitrilo, acid amido and ureido;
impregnating the reactor core with the solution of said water-insoluble polymer;
passing through the impregnated reactor core a polymer precipitating agent so as to precipitate said polymer onto the reactor core; and
passing through the reactor core containing the polymer an aqueous solution of an active enzyme and a difunctional agent selected from the group consisting of a dialdehyde, a monomeric polyisocyanate, a bisamidoester and disulfonyl halide whereby said enzyme is adsorbed on said polymer by said groups and is cross-linked in place by said difunctional agent.

30. The method in accordance with claim 29 wherein the active enzyme-containing reactor core is further contacted with an aqueous solution of an organic solvent selected from the group consisting of a lower alkanol and a lower alkyl ketone, each containing up to four carbon atoms, inclusive, in the alkyl portions thereof.

References Cited

UNITED STATES PATENTS

| | | | |
|---|---|---|---|
| 2,987,445 | 6/1961 | Levesque | 117—98 X |
| 3,574,062 | 4/1971 | Sato | 195—63 |
| 2,900,278 | 8/1959 | Powers et al. | 117—98 |

OTHER REFERENCES

Bauman et al.: Preparation of Immobilized Cholinesterase for Use in Analytical Chemistry, Analytical Chemistry, vol. 37, 1965 (pp. 1378–1381).

Bernfeld et al.: Antigens and Enzymes Made Insoluble by Entrapping Them into Lattices of Synthetic Polymers, Science, vol. 142, 1963 (pp. 678–679).

Goldman et al.: Papain Membrane on a Collodion Matrix: Preparation and Enzymic Behavior, Science, vol. 156, 1965 (pp. 758–760).

Habeeb: A.F.S.A., Preparation of Enzymatically Active, Water Insoluble Derivatives of Trypsin Archives of Biochemistry and Biophysics, vol. 119, 1967 (pp. 264–268).

Silman et al.: Some Water-Insoluble Papain Derivatives, Biopolymers, vol. 4, 1966 (pp. 441–448).

JOSEPH M. GOLIAN, Primary Examiner

D. M. NAFF, Assistant Examiner

U.S. Cl. X.R.
195—68, DIG. 11